United States Patent [19]

Babineaux

[11] Patent Number: 5,893,636
[45] Date of Patent: Apr. 13, 1999

[54] STUDIO LIGHTING FIXTURE

[76] Inventor: James R. Babineaux, 33033 Angeles Forest Hwy., Palmdale, Calif. 93550

[21] Appl. No.: 08/872,157

[22] Filed: Jun. 10, 1997

Related U.S. Application Data

[63] Continuation-in-part of application No. 08/642,315, May 3, 1996, Pat. No. 5,791,773.
[51] Int. Cl.$^6$ ..................................................... F21V 1/06
[52] U.S. Cl. ........................... 362/352; 362/358; 362/399; 362/417
[58] Field of Search ................................. 362/352, 353, 362/357, 358, 417, 450, 399

[56] References Cited

U.S. PATENT DOCUMENTS 3,769,504  10/1973  Hesse et al. ........................... 362/352
4,167,034   9/1979  Noguchi ............................. 362/352 X
4,562,521  12/1985  Noguchi ............................. 362/358 X

*Primary Examiner*—Stephen Husar
*Attorney, Agent, or Firm*—Elliott N. Kramsky

[57] ABSTRACT

A portable lighting fixture includes a removable light-diffusing covering of predetermined light transmission character that is maintained in a substantially-spherical shape by an underlying frame. The frame consists of cage formed of a pair of spaced-apart rings that are joined to one another by a plurality of ribs. A harp for positioning a light bulb engages both the upper and lower rings of the cage whereby the height of the harp defines that of the cage of the assembled frame. The heights of the ribs are such that, as the distance between the rings of the cage is compressed through interengagement to the harp, they define the desired spherical shape for mounting the light-diffusing covering.

11 Claims, 3 Drawing Sheets

5,893,636

1

STUDIO LIGHTING FIXTURE

REFERENCE TO RELATED APPLICATION

The present application is a continuation-in-part of U.S. patent application Ser. No. 08/642,315 of James Babineaux for "Hand-Held Studio Lighting Fixture" filed May 3, 1996, now U.S. Pat. No. 5,791,773.

BACKGROUND

1. Field of the Invention

The present invention relates to lighting fixtures suitable for movie or film stage use. More particularly, this invention is directed to a durable, versatile and reusable fixture capable of hand-held use.

2. Description of the Prior Art

Lighting quality often determines the quality of a photographic product, whether still or motion. Unnatural shadows impair photographic quality. Such shadows are often produced by directional studio lighting and are particularly destructive in the case of studio photography of supposedly "outside" shots.

A number of lighting systems have been employed in the past for lessening oftentimes-stark appearances created by point sources. Such systems conventionally incorporate a back reflector for broadening the light beam generated by a high wattage globe. An example of such prior art apparatus is the product commercially available under the designation STUDIO SOFT LIGHT from Mole-Richardson. This system uses a back reflector whose surface is white. The system weighs approximately five to ten pounds, sufficiently heavy to complicate extended hand-held operation. Even with the broadening effect provided by the reflector, an undesirable degree of directionality remains. This is due, in part, to the finite size and opaqueness of the reflector. Further, systems of this type generate substantial amounts of heat, much of which is absorbed by the reflector and not dissipated. As mentioned earlier, systems of this type can become rather uncomfortable and difficult to manipulate over extended periods of hand-held use, limiting their flexibilities.

Pending U.S. patent application No. 08/642,315 of James Babineaux entitled "Studio Lighting Fixture" discloses an improved hand-held fixture that includes a harp frame for mounting a paper lantern (a.k.a. a "china ball") whose spherical shape is supported by an integral spiral wire. While providing ready portability and improved lighting effects, that device is hampered by the relatively-flimsy structure of the spherical lantern that is inherently stretched in application by the affixation to the harp frame.

SUMMARY OF THE INVENTION

The present invention addresses the aforesaid disadvantages of the prior art by providing a portable lighting fixture. The fixture includes a covering of predetermined light transmission character. A frame is provided for supporting the covering in a substantially-spherical shape. The frame includes means for mounting a light bulb internally of the covering. The frame comprises (i) a harp that includes an integral U-shaped member and a crosspiece that spans the opposed legs of the U-shaped member adjacent its free ends (ii) a cage that includes a lower ring, an upper ring and a plurality of elongated ribs for joining the upper ring to the lower ring and (iii) means for interlocking the harp with the cage.

The preceding and other features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1:
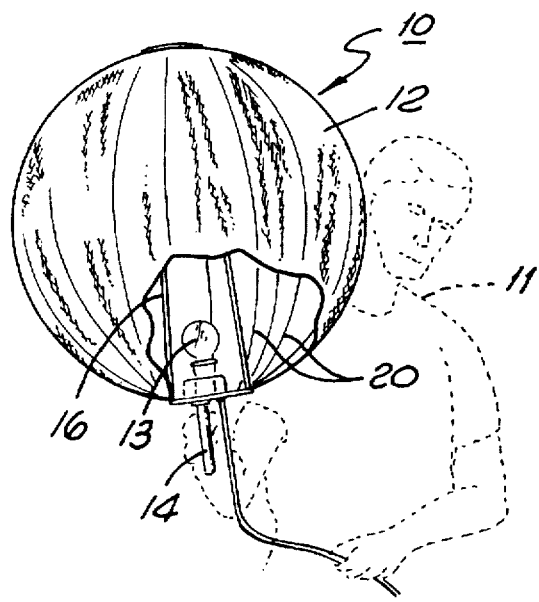
FIG. 1 is a partially-broken perspective view of a lighting fixture in accordance with the invention employed in a hand-held mode.

Turning now to the drawings, FIG. 1 is a partially-broken perspective view of a lighting fixture 10 in accordance with the invention with an operator 11 indicated in shadow outline for illustration of the hand-held mode. The fixture, which provides non-directional and substantially shadow-free light for high quality photography, such as is often required, for example, in motion picture usages, includes a light-diffusing covering 12 which is maintained in a substantially-spherical shape over a frame (not shown) that includes means for mounting an incandescent light bulb 13. The fixture 10 thereby serves to diffuse the light emitted by the point source bulb 13 to reduce shadowing and other undesirable effects of directionality.

The surface of the covering 12, which includes a plurality of regularly-spaced longitudinal seams, is preferably of fabric having predetermined light-transmission qualities. Further, a circular cap 15 is removably mounted to the top of the covering by means of VELCRO or like fastener. Such cap 15 is employed to diffuse light emitted from a polar aperture (for venting heat) during periods that the polar area of the sphere is required for illumination purposes. As will be seen below, by providing a sturdy support frame that is separate from the covering 12, the fixture may be configured to provide a range of lighting effects through the ready substitution of coverings of differing light transmission characteristics.

A handle 14 protrudes from the bottom of the fixture 10 along with a power cord 15 that comes from a light fixture fixed within the covering 12.

Figure 2:
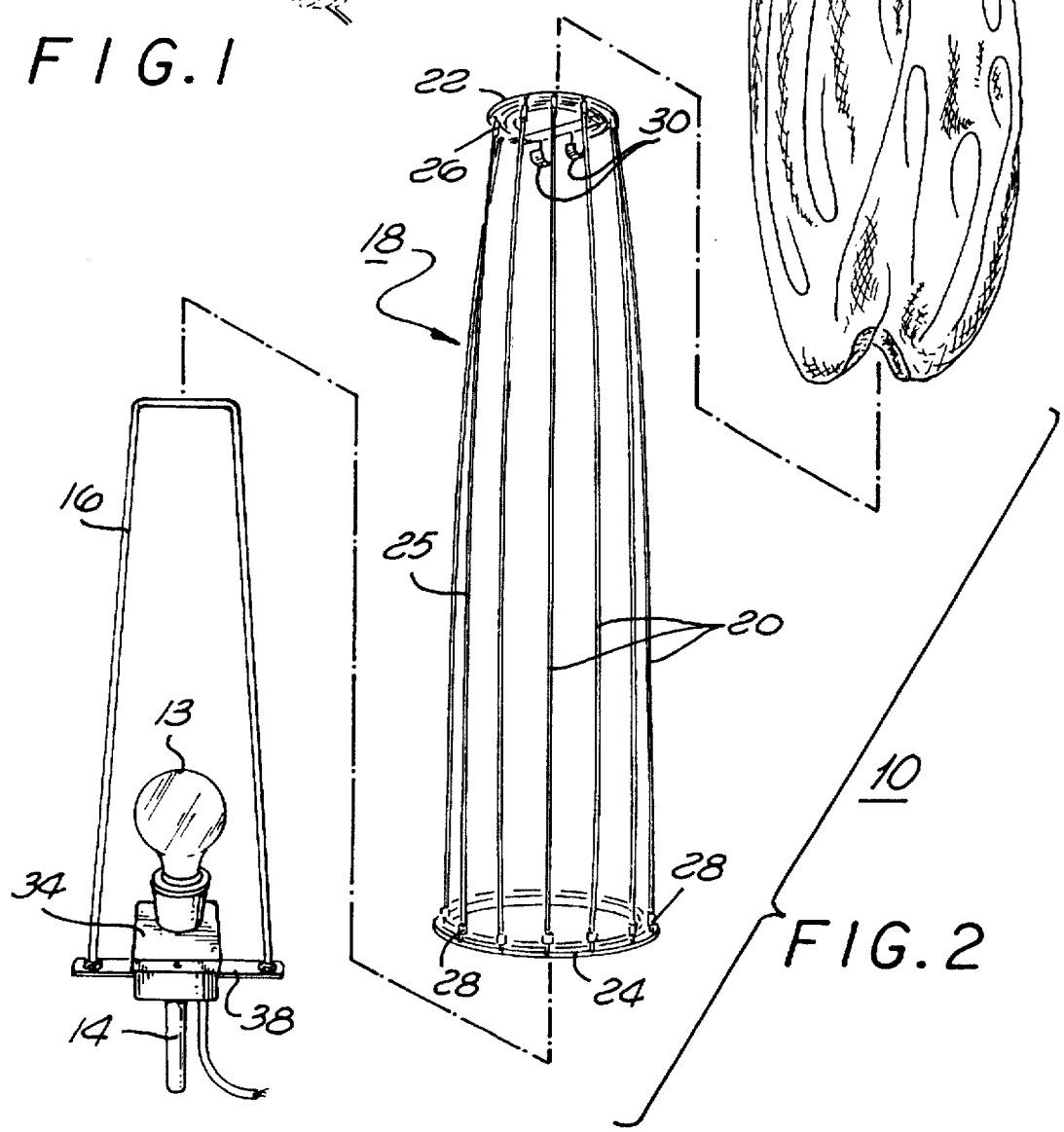
FIG. 2 is an exploded perspective view for illustrating the various cooperative elements of the invention.

FIG. 2 is an exploded perspective view for illustrating the various cooperative elements of the fixture 10. A harp 16 and a cage 18 cooperate to form the frame that supports the otherwise-flaccid covering 12. Referring first to the cage 18, such apparatus includes an upper ring 22 and a lower ring 24 that are maintained in spaced-apart, generally-parallel relation (prior to assembly of the frame) by means of a plurality of longitudinal ribs 20. Referring particularly to the representative rib 25 it is seen that this member of spring steel fabrication is held at its upper end to the upper ring by means of a rib fixture 26 and is held at its lower end to the lower ring 24 by means of a fixture 28. As will be discussed below, each of the representative rib fixtures 26 and 28 is pivotally maintained at the upper ring 22 and at the lower ring 24 respectively. The lengths of the ribs are such that, at rest, the upper ring 22 is separated from the lower ring 24 by a distance that exceeds the height of the harp 16. Further, it will be seen that the height of the cage 18 relative to that of the harp 16 is chosen so that the ribs 20 (of tempered stainless steel wire) will bulge outwardly, when the cage 18 is engaged to the harp 16, to form a spherical shape for supporting the covering 12. The material composition of a rib assures its repeatable flexure to and from the requisite shape for supporting the covering 12 in a substantially-spherical shape.

Referring back to the cage 18, an upper crosspiece spans the diameter of the upper ring 22 to support twin hooks 30. The hooks 30 will be seen to engage the upper portion of the harp 16 when the frame is assembled.

Referring now to the structure of the harp 16, a junction box 34 for receiving the light bulb 13 is fixed to a crosspiece 38. The opposed, generally parallel legs of an inverted U-shaped member 40 are affixed adjacent the ends of the crosspiece 38 as shown.

Figure 3:
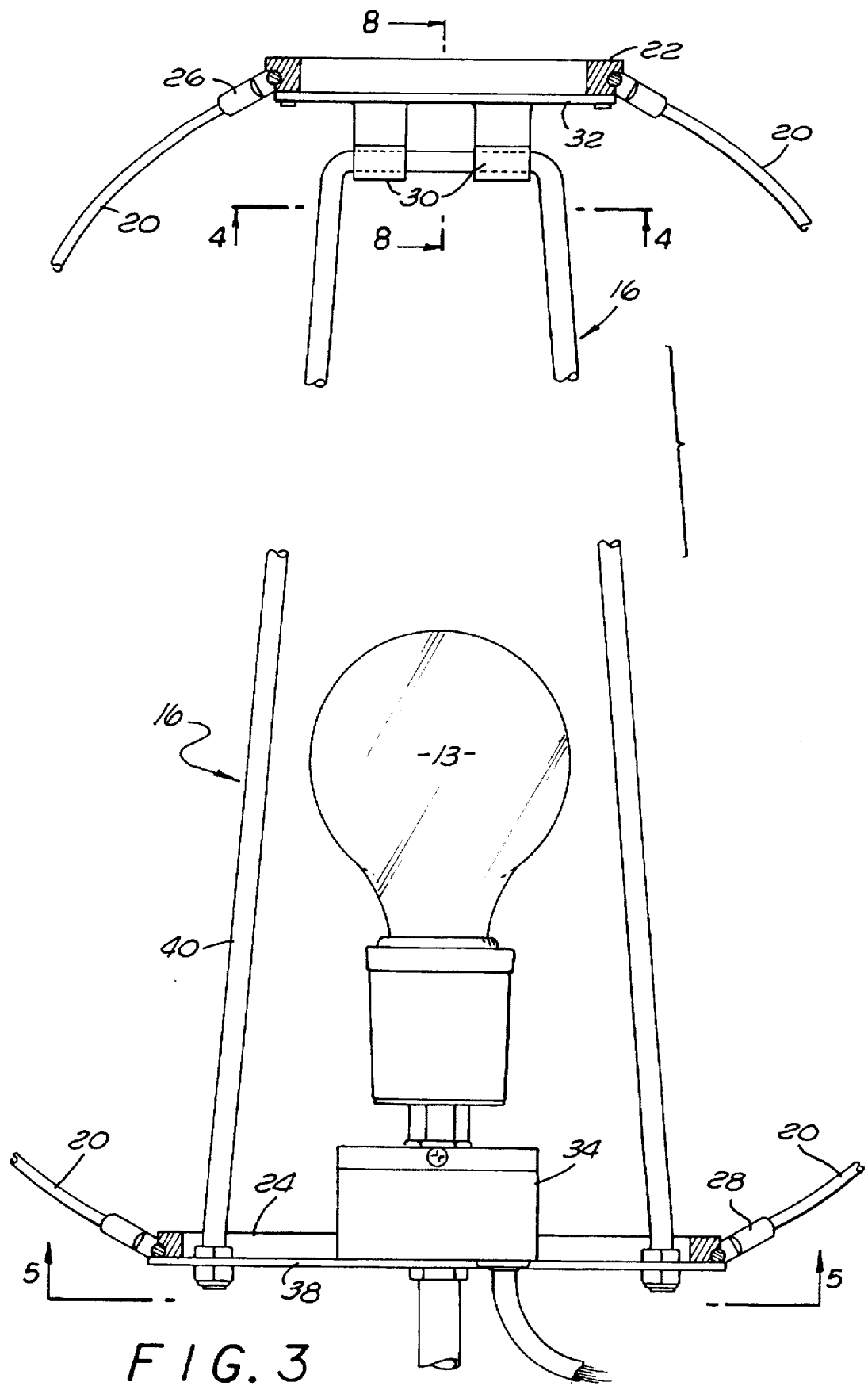
FIG. 3 is a partially-broken detailed front elevation view for illustrating the interengagement of the harp and cage to form the frame of the invention.
Figure 4:
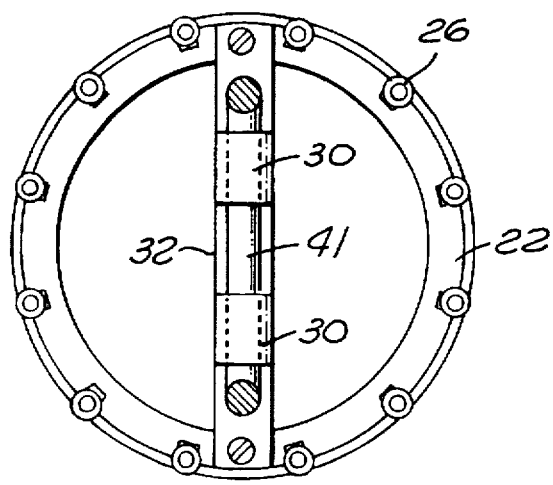
FIG. 4 is a cross-sectional view of the frame taken at line 4—4 of FIG. 3 for illustrating in detail the hooked engagement of the upper crossbar of the harp to the cage.
Figure 8:
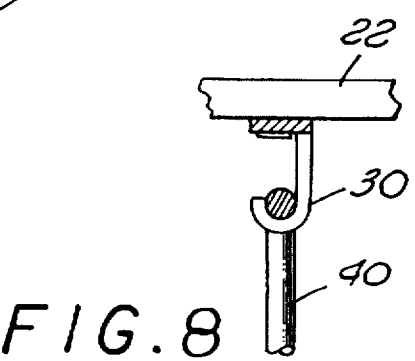
FIG. 8 is a detailed side elevation view taken at line 8—8 of FIG. 3 for illustrating the hooked engagement of the upper crossbar of the harp to the cage.

FIG. 3 is a partially-broken detailed front elevation view of the harp 16-and-cage 18 as engaged to one another to form a substantially-spherical supporting frame while FIG. 4 is a cross-sectional view of the frame taken at line 4—4 for illustrating in detail the hooked engagement of the upper crossbar 41 of the harp 16 to the cage 18. FIG. 8 presents a detailed side elevation view taken at line 8—8 of FIG. 3 for illustrating the hooked engagement from yet another perspective.

Returning to FIG. 3, a generally-spherical shape is assumed when the inverted U-shaped member 40 of the harp 16 is inserted upwardly through the lower ring 24 of the cage 18. The ends of the lower crosspiece 38 then engage and lock onto the lower ring 24 at the same time the harp 16 is hooked at the upper ring 22. As this takes place, (representative) rib end fixtures 26 and 28, which pivotally secure the ribs to the upper and lower ends 22 and 24 of the cage 28, come under compressive forces that cause the ends to deflect outwardly as shown until the travel of the harp 16 within the cage 18 ends with the top of the inverted U-shaped member 40 being caught by the hooks 30 associated with the upper ring 22. As mentioned earlier, the lengths of the ribs 20 exceed the height of the inverted U-shaped member 40 to such an extent that a spherical shape will be reliably defined by them. Once a spherical configuration is assumed, the covering 12 may then be stretched or fitted over the assembled frame to form the completed fixture 10 as shown in FIG. 1. Such spherical configuration need only be assumed at times of use. Otherwise, the apparatus is quickly collapsed for storage as the separate elements of FIG. 2.

Figure 5:
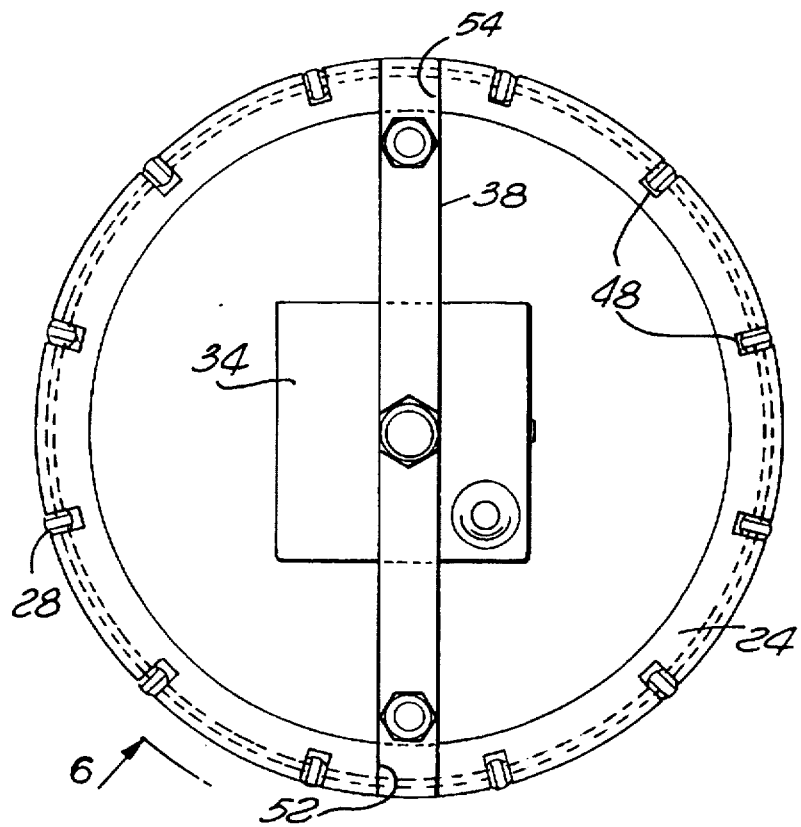
FIG. 5 is a bottom plan view of the interlocked harp and cage that form the frame taken at line 5—5 of FIG. 3.

FIG. 5 is a bottom plan view of the assembled frame taken at line 4—4 of FIG. 3. As may be observed, the lower crosspiece 38 of the harp 16 is received within diametrically-opposed slotted grooves 52, 54 that are machined into the bottom of lower ring 24 of the cage 18. Thus, at the same time that the upper crossbar 41 of the inverted U-shaped member 40 is received at the hooks 30, the lower end of the harp 16 is captured and locked against rotation by the lower ring 24.

Figure 6:
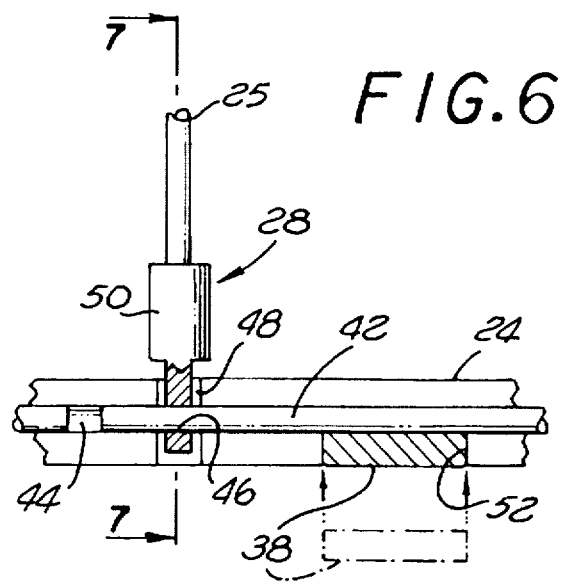
FIG. 6 is a detailed side elevation view of a lower portion of the frame of the invention taken in the direction of line 6—6 of FIG. 5.
Figure 7:
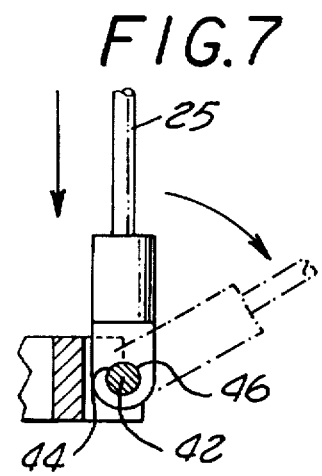
FIG. 7 is a detailed side elevation view, partially in section, taken at line 7—7 of FIG. 6 for illustrating the pivotal mounting of a representative rib to the frame of the invention.

FIGS. 6 and 7 illustrate the arrangements for attaching the ribs to the upper and lower rings 22, 24 of the cage 18. The discussion will proceed with reference to the affixation of the representative rib 25 to the lower ring 24, it being appreciated that substantially the same type of arrangement is employed to affix the upper end of the rib 25 to the upper ring 22.

FIG. 6 is a detailed side elevation view of the frame taken at line 6—6 of FIG. 5. The lower end of the rib 25 is crimped to a rib fixture 28 that includes a yoke 48 having a transverse aperture 46 for receiving a split snap ring 42. The ring 42 fits within a peripheral grove 44 of the lower ring 24 and is split for ease of assembly. A representative radial grove 48 is machined into the upper ring 22 to provide clearance as the rib fixture is pivoted about the snap ring 42 in response to the compressive force encountered as the harp 16 is inserted into the cage 18. By providing such pivotal engagement between the upper and lower ends of the ribs of the cage and the upper and lower rings respectively, stressing of the wire ribs at their endpoints is minimized during flexure. The pivotal rotation of the end fixture of a representative rib is shown in FIG. 7, a detailed side elevation view, partially in section, taken at line 7—7 of FIG. 6.

Thus it is seen that the present invention provides a rugged and reliable substantially non-directional and shadow-free lighting fixture suitable for both hand-held and fixed operation (e.g. when mounted by clamps.) Due to the independence of the frame and the covering 12, numerous lighting effects may be accomplished with a single frame. varying material compositions (and materials of various colorings for filtration purposes) may be substituted as coverings. The frame may be readily disassembled when not in use for compact storage.

Thus it is seen that the present invention provides an improved lighting fixture that is particularly useful for creating desirable lighting effects for high quality motion and still photograph. While this invention has been disclosed with reference to its presently preferred embodiment, it is not limited thereto. Rather, this invention is limited only insofar as it is defined by the following set of patent claims and includes within its scope all equivalents thereof.

What is claimed is:

1. A portable lighting fixture comprising, in combination:
   a) a covering of predetermined light transmission character;
   b) a frame for supporting said covering in a substantially-spherical shape;
   c) said frame including means for mounting a light bulb internally of said covering; and
   d) said frame comprising (i) a harp including an integral U-shaped member and a crosspiece spanning the opposed legs of said U-shaped member adjacent the free ends thereof; (ii) a cage including a lower ring, an upper ring and a plurality of elongated ribs for joining said upper ring to said lower ring; and (iii) means for interlocking said harp with said cage.

2. A portable lighting fixture as recited in claim 1 further including:
   a) said harp being of a first height;
   b) said cage being of a second height; and c) said second height exceeding said first height so that, when said harp is interlocked with said cage, said frame assumes a generally-spherical shape.

3. A portable lighting fixture as recited in claim 2 wherein said means for interlocking further includes:
   a) a hook adapted to receive the top portion of said inverted U-shaped member;
   b) means for fixing said hook to said upper ring of said cage; and
   c) means associated with said lower ring for receiving said crosspiece of said harp.

4. A portable lighting fixture as defined in claim 3 wherein each of said ribs further includes means for pivotally mounting the ends thereof to said upper and lower rings of said cage.

5. A portable lighting fixture as recited in claim 4 wherein said means for pivotally mounting said rib further comprises:
   a) a fixture for receiving an end of said rib, said fixture including a yoke having an internal aperture;
   b) a peripheral snap ring associated with said rings of said cage; and
   c) said snap ring passes through said aperture for pivotal affixation of said rib.

6. A portable lighting fixture as recited in claim 5 wherein each of said lower and upper rings of said cage includes a plurality of radial grooves for providing pivotal clearance.

7. A portable lighting fixture as recited in claim 6 wherein each of said fixtures is crimped to an end of an associated rib.

8. A portable lighting fixture as recited in claim 3 wherein said means for mounting a bulb further includes:
   a) a junction box; and
   b) said junction box is fixed to the interior surface of said crosspiece of said harp.

9. A portable lighting fixture as recited in claim 8 further including a handle fixed to the exterior surface of said crosspiece of said harp.

10. A portable lighting fixture as recited in claim 9 wherein said covering further includes:
    a) a plurality of pieces of fabric material; and
    b) said pieces of material are arrayed adjacent one another and joined by a plurality of longitudinal seams so that said covering forms a substantially spherical shape over said frame defined by said interlocked harp and cage.

11. A portable lighting fixture as recited in claim 10 wherein said covering further includes:
    a) at least one polar aperture;
    b) a circular cap of predetermined fabric; and
    c) means for removably securing said cap to said covering so that it covers said aperture.

* * * * *